(12) United States Patent
Tomioka (10) Patent No.: US 8,089,269 B2
(45) Date of Patent: Jan. 3, 2012

(54) ANNULAR MAGNETIC ENCODER

(75) Inventor: Masanori Tomioka, Okayama (JP)

(73) Assignee: Uchiyama Manufacturing Corp., Okayama (JP)

( * ) Notice: Subject to any disclaimer, the term of this patent is extended or adjusted under 35 U.S.C. 154(b) by 200 days.

(21) Appl. No.: 12/309,832

(22) PCT Filed: Jul. 30, 2007

(86) PCT No.: PCT/JP2007/064900
§ 371 (c)(1),
(2), (4) Date: Apr. 13, 2009

(87) PCT Pub. No.: WO2008/018313
PCT Pub. Date: Feb. 14, 2008

(65) Prior Publication Data
US 2010/0001717 A1    Jan. 7, 2010

(30) Foreign Application Priority Data

Aug. 10, 2006  (JP) ................................ P2006-218400

(51) Int. Cl.
*G01B 7/14* (2006.01)
(52) U.S. Cl. ................................ 324/207.2; 324/207.25
(58) Field of Classification Search .................. 384/448;
324/207.25, 173, 174, 178, 179, 514.39,
324/207.2
See application file for complete search history.

(56) References Cited

U.S. PATENT DOCUMENTS

| 4,899,145 | A  | * | 2/1990  | Okuda et al. ..................... 341/15 |
| 5,847,483 | A  | * | 12/1998 | Suzuki et al. ............. 310/156.45 |
| 6,927,705 | B2 | * | 8/2005  | Isobe .............................. 341/13 |
| 2002/0022913 | A1 | | 2/2002 | Font |
| 2005/0031239 | A1 | * | 2/2005 | Aoki et al. ..................... 384/448 |
| 2005/0230920 | A1 | * | 10/2005 | Toth et al. ..................... 277/317 |

FOREIGN PATENT DOCUMENTS

| DE | 198 00 774 A1 | 7/1999 |
| JP | 63 30718 A | 9/1988 |
| JP | 2001-255337 | 9/2001 |
| JP | 2002-139351 A | 5/2002 |

* cited by examiner

*Primary Examiner* — Melissa Koval
*Assistant Examiner* — Temilade S Rhodes-Vivour
(74) *Attorney, Agent, or Firm* — Bacon & Thomas, PLLC (57) ABSTRACT

An annular magnetic encoder capable of detecting an absolute position precisely by specifying the shape of a magnetization pattern. The annular magnetic encoder (A) is of such a type that the magnetic poles (2a) of N pole and S pole are formed alternately at an equal pitch by magnetization along the circumferential direction of an annular magnetic body (2), an unequal pitch region (20) is provided at least one place in the circumferential direction of the annular magnetic body (2) corresponding to a plurality of magnetic poles (2a).
The unequal pitch region (20) consists of one specific pole portion (2b) in the center and different pole portions (2c) located on the periphery thereof whose polarity is different from that of the specific pole portion.
Magnetization pattern by the specific pole portion (2b) and the different pole portions (2c) is characterized by being formed line symmetrical relative to the central traverse line of the unequal pitch region (20), and the area of the specific pole portion (2b) is formed so as to occupy 40 to 60% of that of the unequal pitch region (20).

4 Claims, 6 Drawing Sheets

*Fig.6b*

ANNULAR MAGNETIC ENCODER

TECHNICAL FIELD

The present invention relates to a magnetic encoder for detecting an absolute position of the crank angle and the cam shaft angle for controlling the engine of automobile and a magnetic encoder for other industrial machines.

BACKGROUND ART

Recently, the absolute position has been detected for the crank angle and the cam shaft angle of the engine for controlling the automobile engine. An apparatus for detecting the absolute position is constructed such that an annular magnetic encoder is concentrically fixed to a rotary side, the annular magnetic encoder including an equal pitch magnetized region formed by alternately forming the N pole and the S pole at an equal pitch in the circumferential direction and an unequal pitch magnetized portion in which a part of the magnetized region is an unequal pitch portion of the N pole or the S pole and such that a magnetic sensor is provided at a stationary side so as to face the annular magnetic encoder (see the patent document 1). Such an absolute position detection apparatus detects the magnetic change in the equal pitch region and the unequal pitch portion accompanied with rotation of the rotary side to determine the detection output at the unequal pitch magnetized region as an origin position and detects the absolute position of the crank angle and the cam shaft by the relative difference with the pulse number of the detection output at the equal pitch magnetized region.

Figure 6A:
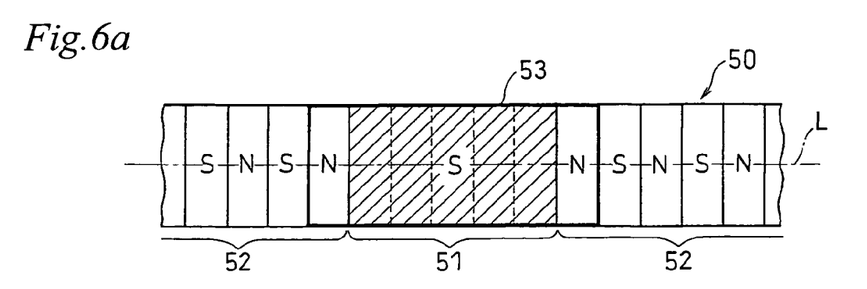
FIG. 6a is a partial development view of the prior annular magnetic encoder and FIG. 6b shows the waveform chart of the magnetic flux density of the magnetic encoder.
Figure 6B:
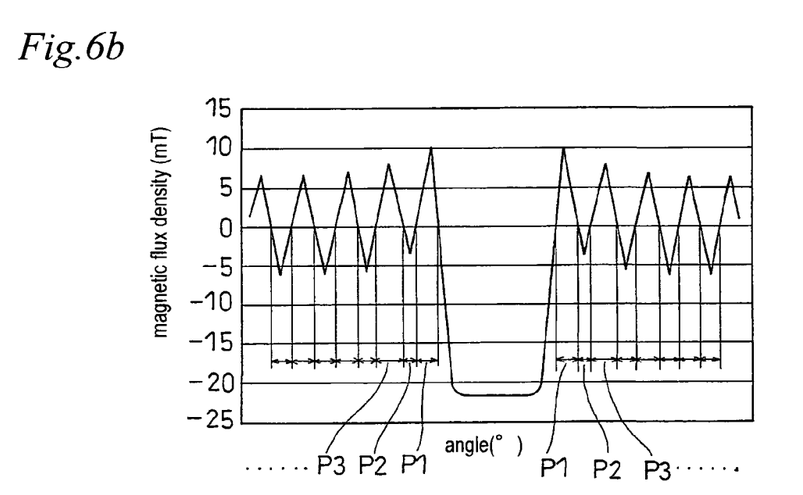

FIG. 6a and FIG. 6b show a partial development view of one embodiment of the magnetic encoder used for the above-mentioned absolute position detection apparatus and the waveform chart of the magnetic flux density of the magnetic encoder. FIG. 6a is a partial cutaway view of an annular magnetic encoder 50 in which an unequal pitch magnetized region 51 of the S poles equivalent to a plurality of magnetic poles (odd number, for example 5 in the figure) at a part of an equal pitch magnetized region in which the N pole and the S pole are formed alternately at an equal pitch along the circumferential direction. The both sides of the unequal pitch magnetized region 51 are connected with the equal pitch magnetized region 52 in which the N poles and the S poles are alternately formed at an equal pitch. The region comprising the unequal pitch magnetized region 51 and each one N pole at both sides is defined as the unequal pitch region (portion enclosed with the heavy solid line in the figure) and the area ratio of the unequal pitch magnetized region 51 for the unequal pitch region 53 becomes about 71%. FIG. 6b conceptually shows the waveform chart of the magnetic flux density detected by relatively scanning the magnetic sensor in the circumferential direction of the annular magnetic encoder 50 along the sensor measurement line L (a center line in the width direction of the annular magnetic encoder 50) in FIG. 6a.

Patent Document 1: German Patent Publication No. 19800774A1

DISCLOSURE OF INVENTION

Problems to be Solved in the Invention

When there is an area (unequal pitch magnetized region 51) of which pole width is different from other area (equal pitch magnetized region 52) like the magnetic encoder 50 shown in FIG. 6a, the waveform of the magnetic flux density is turbulent at both sides of the unequal pitch magnetized region 51 because of the balance of the magnetic flux density. Namely, seeing at the zero cross pitch P1, P2 (pitch crossing the value zero) . . . of the waveform, the pitch width varies. When the zero cross pitch width of the waveform varies widely as shown in FIG. 6b, the detection accuracy of the angle position is lowered. Specifically when the unequal pitch magnetized region 51 is only allotted to the area occupying the plural poles like the magnetic encoder 50 shown in FIG. 6a, it has been found by the inventors of the present invention that the pitch width unavoidably causes wide variation.

The present invention is proposed in view of the above-mentioned problems and its object is to provide an annular magnetic encoder which can accurately detect the absolute position by specifying the shape of the magnetized pattern.

Means to Solve the Problems

The present invention proposes an annular magnetic encoder magnetized by forming magnetic poles of N pole and S pole alternately at an equal pitch along the circumferential direction of an annular magnetic body, wherein an unequal pitch region is provided at least one portion in the circumferential direction of the annular magnetic body corresponding to a plurality of the magnetic poles, the unequal pitch region comprising a specific pole portion at the center and a different pole portion located at the periphery thereof whose polarity is different from that of the specific pole portion; and wherein the magnetization pattern defined by the specific pole portion and the different pole portion is formed in line symmetrical relative to the central traverse line of the unequal pitch region, and the area of the specific pole portion is 40 to 60% of the area of the unequal pitch region.

In the present invention, according to claim 2, the specific pole portion may be preferably formed like a letter of H which is line symmetrical relative to the central traverse line. According to claim 3, it may be preferably formed polygonal which is line symmetrical relative to the central traverse line. And further according to claim 4, the different pole portion located at both sides of the specific pole portion along the circumferential direction of the annular magnetic body is divided by the specific pole portion. Still further according to claim 5, the annular magnetic body comprises a molded body made of magnetic rubber or magnetic resin.

Effect of the Invention

According to the annular magnetic encoder of the present invention, an unequal pitch region equivalent to a plurality of the magnetic poles is provided at at least one portion in the circumferential direction of an annular magnetic body and the unequal pitch region comprises a specific pole portion at the center and a different pole portion located at the periphery thereof and having a polarity different from that of the specific pole portion. Therefore, the waveform of the sensor detection magnetic flux density at the specific pole portion in the unequal pitch region is different from that of the other region where the magnetic poles are formed at the equal pitch region. As the result, the magnetic encoder can be used for absolute positional detection defining the specific pole portion as the origin position. The magnetization pattern by the specific pole portion and the different pole portion is formed line symmetrical relative to the central traverse line of the unequal pitch region, so that the waveform of the magnetic flux density corresponding to the specific pole portion and the different pole portion at both sides thereof appears line symmetrical relative to the central traverse line. In addition, the area of the specific pole portion is 40 to 60% (referred as area ratio hereinafter) of the area of the unequal pitch region. Therefore, the magnetic flux density of the specific pole portion and that of the different pole portion therearound are resonated each other, the disturbance of the magnetic flux density around the both sides of the specific pole portion by the magnetic pole portion is reduced, and the variation of the zero cross pitch is reduced. Accordingly, when the annular magnetic sensor is used for an angle detection in combination with the magnetic sensor, the accuracy of angle position detection is improved. Specifically, when the area ratio is less than 40%, the influence of the different pole portion is increased, and when it exceeds 60%, the influence of the specific pole portion is increased, thus the dispersion of the zero cross pitch tends to be wide.

The shape of the specific pole portion is formed like the letter H or polygonal which is line symmetrical relative to the central traverse line as mentioned in claim 2 or claim 3, the waveform of the magnetic flux density corresponding to the specific pole portion and the different pole portion at both sides thereof becomes line symmetrical relative to the central traverse line and further the area ratio can be easily set. Namely, the shape of the letter H and polygonal is formed by cutting off the side or the corner of the basic square shape, so that it can be easily produced by adjusting the cutting amount in order to produce the magnetizing yoke of a magnetizing apparatus, thereby easily achieving appropriate area rate.

In this invention, when the different pole portion located at both sides of the specific pole portion along the circumferential direction of the annular magnetic body is divided by the specific pole portion, like claim 4, the influence of the different pole portion on the waveform of the magnetic flux density of the specific pole portion is decreased and the waveform does not show strain, thereby improving the origin detection accuracy. In addition, like claim 5, when the annular magnetic body comprises a molded body made of a magnetic rubber or a magnetic resin, a desirable shape and a desirable magnetization pattern may be facilitated and the area ratio can be easily set.

BRIEF DESCRIPTION OF DRAWINGS

FIG. 1 shows one embodiment of the annular magnetic encoder of the present invention.

EXPLANATION OF REFERENCE NUMERAL 2 annular magnetic body
2a magnetic pole
2b specific pole portion
2c different pole portion
20 unequal pitch region
A, A1 annular magnetic encoder
B annular magnetic encoder
C central traverse line

BEST MODE FOR CARRYING OUT THE INVENTION

Figure 2A:
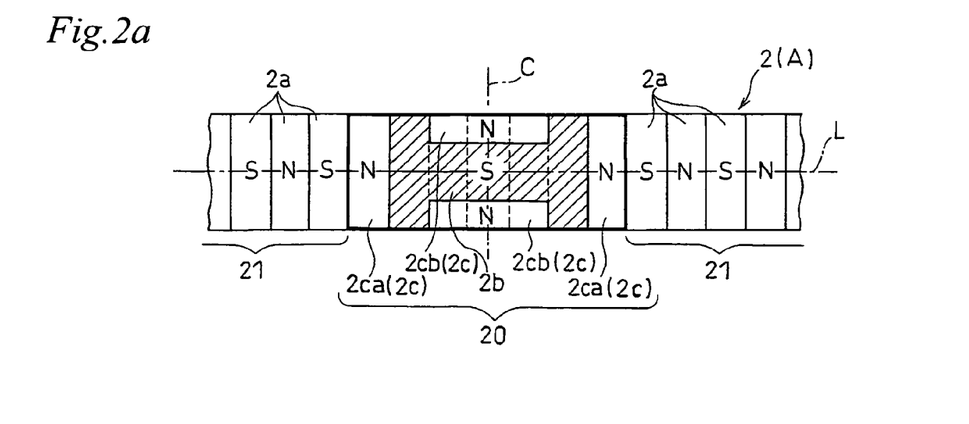
FIG. 2a is a partial development view when the annular magnetic encoder in FIG. 1a is seen from the side and FIG. 2b is the waveform chart of its magnetic flux density.
Figure 2B:
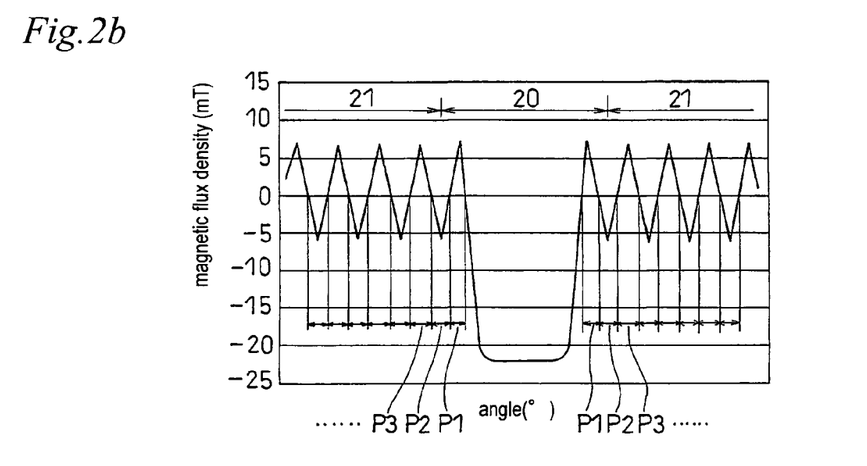
Figure 3A:
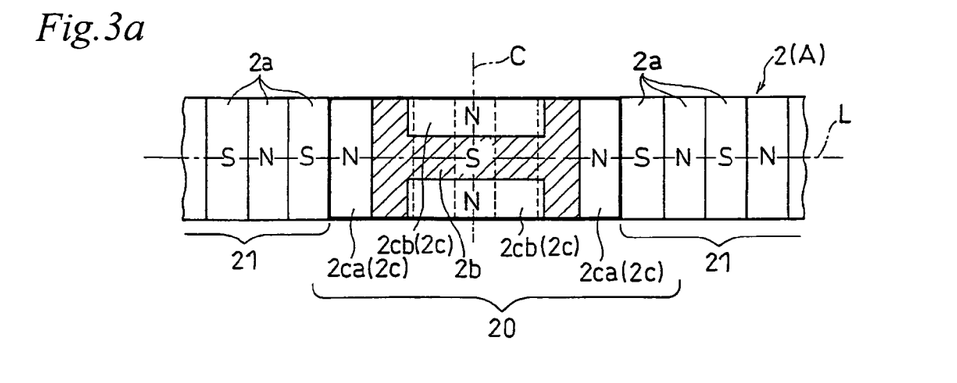
FIG. 3a and FIG. 3b are views similar to those of FIG. 2a and FIG. 2b of the critical example of the same embodiment.
Figure 3B:
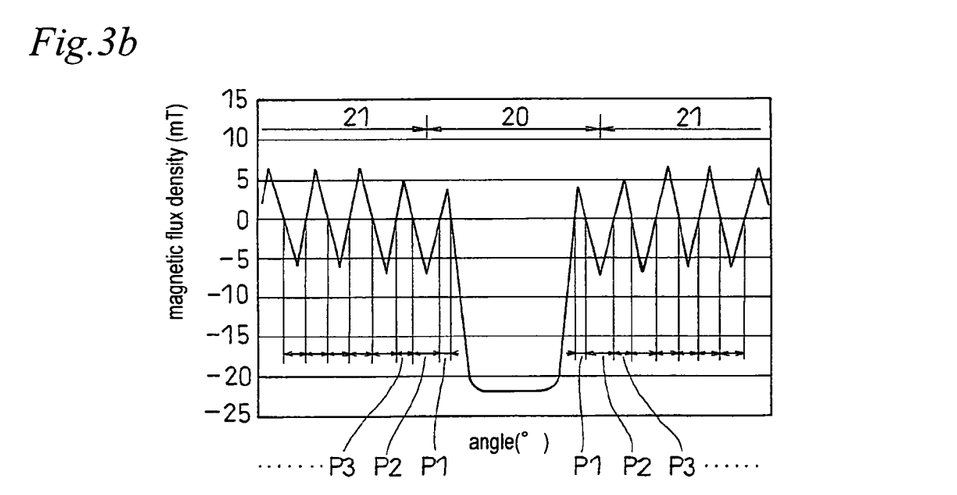
Figure 4A:
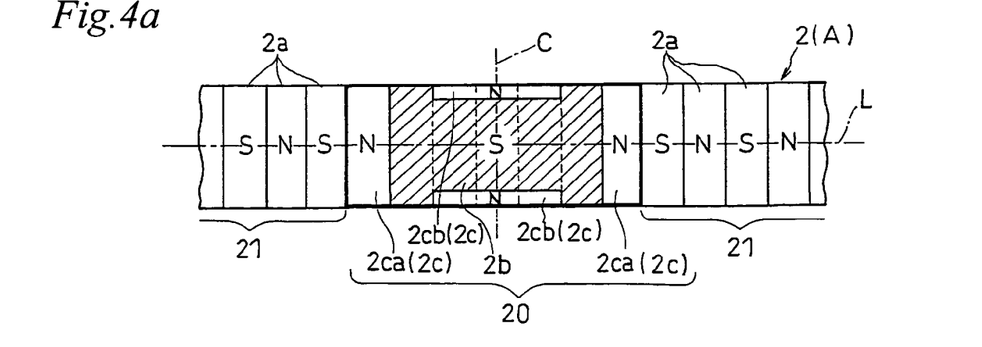
FIG. 4a and FIG. 4b are views similar to those of FIG. 2a and FIG. 2b of the other critical example of the same embodiment.
Figure 4B:
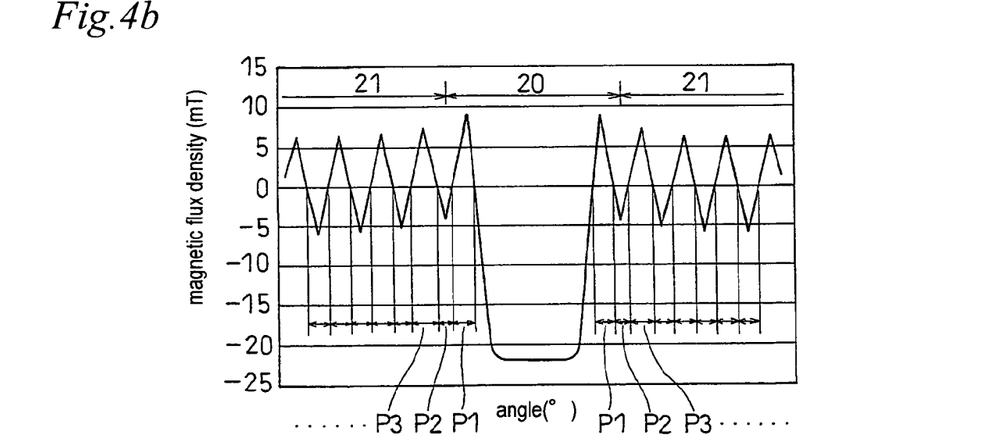
Figure 5A:
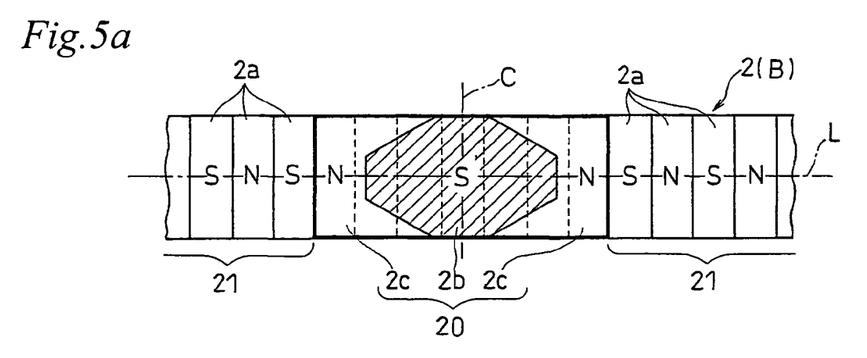
FIG. 5a and FIG. 5b are views similar to those of FIG. 2a and FIG. 2b of the other embodiment.
Figure 5B:
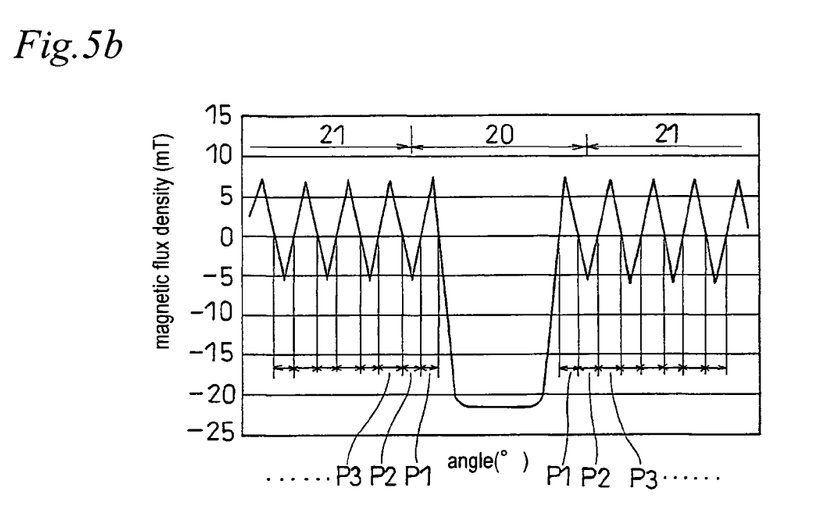

The best mode for carrying out the present invention is explained referring to the attached drawings. FIG. 1 shows one embodiment of the annular magnetic encoder of the present invention, FIG. 1a shows the partially cutaway perspective view of a radial type one, FIG. 1b shows the partially cutaway perspective view of an axial type one, FIG. 2a is a partial development view when the annular magnetic encoder in FIG. 1a is seen from the side, FIG. 2b is the waveform chart of its magnetic flux density, FIG. 3a and FIG. 3b are views similar to those of FIG. 2a and FIG. 2b of the critical example of the same embodiment, FIG. 4a and FIG. 4b are views similar to those of FIG. 2a and FIG. 2b of the other critical example of the same embodiment, FIG. 5a and FIG. 5b are views similar to those of FIG. 2a and FIG. 2b of the other embodiment, FIG. 6a is a partial development view of the prior annular magnetic encoder, and FIG. 6b shows the waveform chart of the magnetic flux density of the magnetic encoder.

Embodiment 1

Figure 1A:
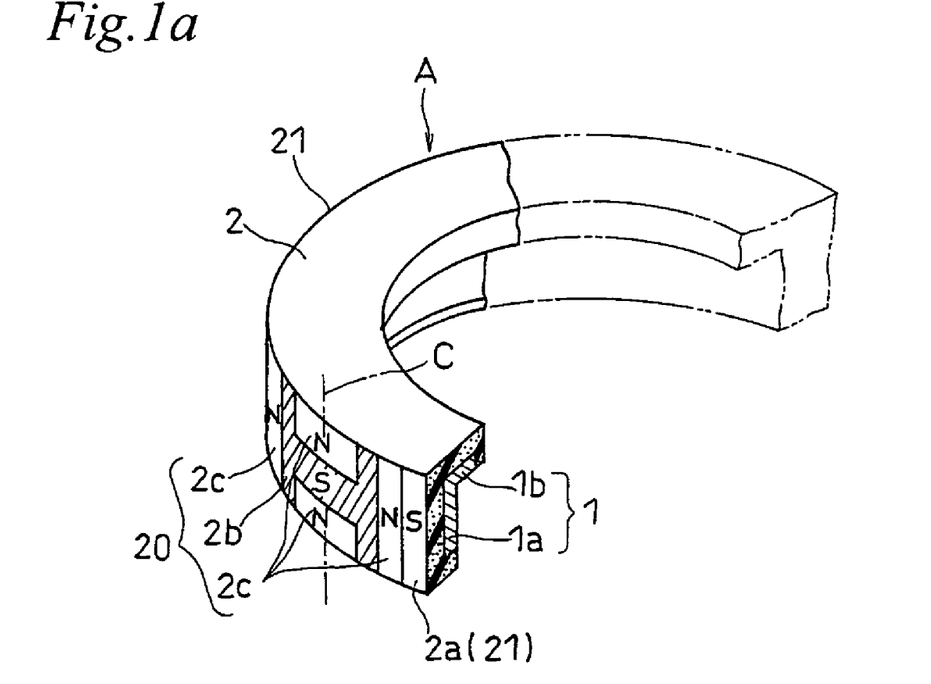
FIG. 1a shows the partially cutaway perspective view of a radial type one and FIG. 1b shows the partially cutaway perspective view of an axial type one.
Figure 1B:
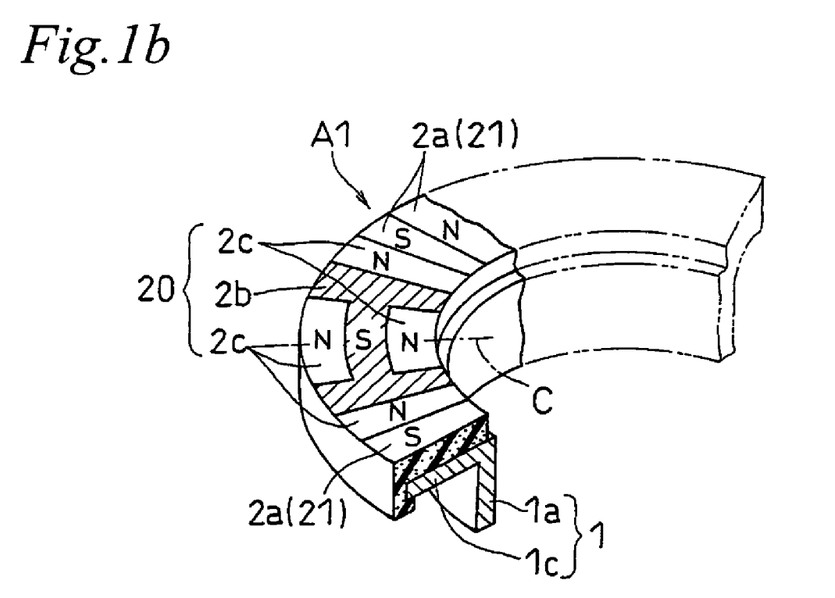

The annular magnetic encoder shown in FIG. 1a and FIG. 1b comprises an annular magnetic body consisting of a molded body of rubber material including magnetic powders and a reinforcing annular base plate. The annular magnetic encoder A in FIG. 1a is formed such that the annular magnetic body 2 made of rubber material is attached to be integrated (by vulcanizing adhesion and the like) on the outer face of the annular base plate 1 consisting of a cylindrical portion 1a and an inward flange portion 1b connected at one end thereof. The annular magnetic encoder A is a radial type magnetic encoder in which the magnetizing portion is constituted with the cylindrical portion of the annular magnetic body 2 covering the cylindrical portion 1a of the annular base plate 1. The cylindrical portion 1a is externally fitted in a rotary side member, not shown, and the magnetic sensor (not shown) is faced to the magnetizing portion, thereby constituting an absolute position detection apparatus.

According to the annular magnetic encoder A1 in FIG. 1b, the annular base plate 1 comprises the cylindrical portion 1a and an outward brim portion 1c connected at one end thereof and the annular magnetic body 2 consisting of a molded body of rubber material as mentioned above is attached to be integrated (by vulcanizing adhesion and the like) on the outer edge face of the outward brim portion 1c. The annular magnetic encoder A1 is an axial type magnetic encoder in which the magnetizing portion is constituted with the portion of the annular magnetic body 2 which is attached on the outward brim portion 1c. The cylindrical portion 1a is externally fitted in a rotary side member, not shown, and the magnetic sensor (not shown) is faced to the magnetizing portion, thereby constituting an absolute position detection apparatus.

The magnetization of the annular magnetic encoders A, A1 to each magnetized portion of the annular magnetic body 2 is executed by a known magnetizing apparatus. Magnetic poles 2a . . . like the N pole and the S pole are alternately provided to be magnetized at an equal pitch at each magnetized portion of each annular magnetic body 2 along the circumferential direction. In addition, an unequal pitch region 20 equivalent to seven magnetic poles 2a . . . is formed at a part of the circumferential direction and the portion consisting of other magnetic poles 2a . . . at an equal pitch is set as an equal pitch region 21. The portion enclosed with a heavy solid line is set as the unequal pitch region 20 in FIG. 2a. The unequal pitch region 20 comprises one specific pole portion (S pole) 2b at the center and a different pole portion (N pole) 2c which has the different pole from the specific pole portion 2b and is provided therearound. The specific pole portion 2b is formed like the letter H orthogonal to the circumferential direction of the annular magnetic body 2 and the different pole portion 2c is positioned at both sides 2ca of the H-shaped specific pole portion 2b and at a notched portion 2cb at the upper and lower portions. The magnetization pattern by the specific pole portion 2b and the different pole portion 2c is formed in line symmetrical relative to the central traverse line C of the unequal pitch region 20 and the area ratio of the specific pole portion 2b to the unequal pitch region 20 becomes from 40 to 60%. FIG. 2a and FIG. 2b show the example in which the area ratio is 50%.

FIG. 2b conceptually shows the waveform chart of the magnetic flux density detected by relatively scanning the magnetic sensor in the circumferential direction of the annular magnetic encoder A along the sensor measuring line L (the center line in the width direction of the annular magnetic encoder A, namely the annular magnetic body 2). The vertical axis in the figure shows the magnetic flux density and the horizontal axis shows the scanning distance (angle). The magnetic flux density shows the waveform repeating small pitches in the equal pitch region 21, however, it shows a broad waveform of large amplitude in the unequal pitch region 20 as shown in FIG. 6b. Therefore, when the wave number in the equal pitch region 21 is measured as pulse by setting the specific pole portion 2b of the unequal pitch region 20 as a reference (origin), the angle of each portion can be detected.

The area ratio of the specific pole portion 2b for the unequal pitch region 20 in FIG. 2a is 50% as mentioned above. As the result, it is understood in FIG. 2b showing the measured result of the actual magnetic flux density waveform that the zero cross pitches P1, P2 . . . are substantially the same and have little variation. It is because the magnetic flux densities of the specific pole portion 2b and the different pole portion 2c therearound are properly balanced and the magnetic flux density is not disturbed by setting the above-mentioned area ratio at 50%. Further, because the different pole portion 2ca positioned at both sides of the specific pole portion 2b is divided by the specific pole portion 2b, namely it is not continuous, the magnetic flux density waveform of the specific pole portion 2b cannot be distorted and the origin can be accurately detected. Therefore, there provided a magnetic encoder which has high accuracy of angle position detection and is superior for detecting the absolute position of the crank angle and the cam shaft angle of the engine. The pitch width of the different pole portion 2ca provided at both sides of the specific pole portion 2b is preferably set the same as the pitch width of the magnetic pole 2a of other equal pitch region 21.

FIG. 3a and FIG. 3b show an example in which the specific pole portion 2b is formed like the letter H as mentioned above, and the area ratio is 40%. In this case, the magnetic flux density is disturbed at both sides of the specific pole portion 2b and the variation of the zero cross pitch P1, P2 . . . becomes large comparing with the example in FIG. 2 as shown in FIG. 3b. FIG. 4a and FIG. 4b show an example in which the specific pole portion 2b is formed like the letter H as mentioned above, and the area ratio is 60%. In this case, the magnetic flux density is disturbed at both sides of the specific pole portion 2b and the variation of the zero cross pitch P1, P2 . . . becomes large comparing with the example in FIG. 2 as shown in FIG. 4b.

The reason why the variation of the zero cross pitch P1, P2 . . . becomes large as shown in FIG. 3 and FIG. 4 is thought that the effect of the different pole portion 2c is increased in FIG. 3 and the effect of the specific pole portion 2b is increased in FIG. 4, so that the magnetic flux density of the specific pole portion 2b and the different pole portion 2c is not well balanced comparing with the example in FIG. 2. As the result of many trials, it has been found that the allowable range of the variation of the zero cross pitch is the area ratio of 40 to 60% in order to keep a desirable performance as a magnetic encoder. When the area ratio is within the range, a magnetic encoder which is superior for detecting the absolute position of the crank angle and the cam shaft angle can be obtained. As understood from the waveform chart in FIG. 2b, it is preferably 50%. The annular magnetic encoder A in FIG. 3 and FIG. 4 and the annular magnetic encoder A in FIG. 2 are different in the area ratio of the specific pole portion 2b and other constructions thereof are same, so that the common reference numbers are allotted and their explanation is omitted.

Embodiment 2

FIG. 5a and FIG. 5b are the similar view of FIG. 2a and FIG. 2b in other embodiment. The specific pole portion 2b of the annular magnetic encoder B in this embodiment is octagonal obtained by cutting the corners of rectangle. The magnetic poles 2a . . . of the N pole and the S pole are alternately provided to be magnetized at an equal pitch at the magnetized portion of the annular magnetic body 2 along the circumferential direction, the unequal pitch region 20 equivalent to seven magnetic poles 2a . . . is formed at a part of the circumferential direction, and the portion consisting of other magnetic poles 2a . . . at an equal pitch is set as an equal pitch region 21. In FIG. 5a, the portion enclosed with a heavy solid line is set as the unequal pitch region 20 as mentioned above. The unequal pitch region 20 comprises the octagonal specific pole portion 2b, which is magnetized to the S pole, at the center and the different pole portion 2c which is provided therearound and magnetized to the N pole. The different pole portion 2c is divided at both sides of the octagonal specific pole portion 2b (discrete state) and the magnetization pattern by the specific pole portion 2b and the different pole portion 2c is formed in line symmetrical relative to the central traverse line C of the unequal pitch region 20 and the area ratio of the specific pole portion 2b to the unequal pitch region 20 is 50%.

According to this annular magnetic encoder B, as shown in FIG. 5b, the magnetic flux density shows a repeated waveform of small pitch in the equal pitch region 21 but it shows a broad waveform with large amplitude in the unequal pitch region 20. Therefore, when the wave number of the equal pitch region 21 is measured as pulse being the specific pole portion 2b of the unequal pitch region 20 as a reference (origin), the angle of each portion can be detected. Further, it can be understood that the zero cross pitches P1, P2 . . . of the magnetic flux density waveform are substantially the same and the variation is extremely small in FIG. 5b. It is because the magnetic flux densities of the specific pole portion 2b and the different pole portion 2c therearound are properly balanced and the magnetic flux density is not disturbed by setting the above-mentioned area ratio of the specific pole portion 2b to the unequal pitch region 20 at 50%. Further, because the different pole portion 2c positioned at both sides of the specific pole portion 2b is divided by the specific pole portion 2b and disconnected, so that the magnetic flux density waveform of the specific pole portion 2b cannot be distorted and the origin can be accurately detected. Therefore, there provided a magnetic encoder which has high accuracy of angle position detection and is superior for detecting the absolute position of the crank angle and the cam shaft angle of the engine.

The specific pole portion 2b is formed like the letter H or octagonal in the above-mentioned embodiments, these shapes are formed by cutting out the side or the corner of the basic rectangle and are desirable because it is easy to control the above-mentioned area ratio at 40 to 60% when the magnetizing yoke of the magnetizing apparatus is produced. However, as long as the area ratio is 40 to 60% and the shape is line symmetrical relative to the central traverse line C, the shape is not limited to those mentioned above and other shape may be applied. The specific pole portion 2b is the S pole and the different pole portion 2c is the N pole in the above-mentioned embodiments, but these polarity may be reversed. When the polarity is reversed, the shape of the waveform chart of each magnetic flux density is turned upside down. The unequal pitch region 20 may be provided at plural portions along the circumferential direction of the annular magnetic body 2. Various absolute position detections are enabled by providing it at plural portions. Although the unequal pitch region 20 is equal to the region of seven magnetic poles 2a in the above-mentioned embodiments, it may be the region of three, five or nine poles as long as the number is odd.

Further, the annular magnetic body 2 comprises a molded body made of rubber including magnetic powder in the above-mentioned embodiment. However, it may be a molded body of resin including magnetic powder (plastic magnet) or a sintered magnet. The annular magnetic encoder of the present invention is not limited to detect the absolute position of the crank angle or the cam shaft for controlling the automobile engine, but it is applicable for the ABS control or the TCS control of the automobile and for other industrial machine.

The invention claimed is:

1. An annular magnetic encoder comprising an annular magnetic body having magnetic N poles and S poles alternately arranged around a circumference of the annular magnetic body, the annular magnetic body comprising:
    at least one equal pitch annular section wherein N poles and S poles are alternately arranged circumferentially with equal pitch;
    at least one unequal pitch annular section of a size equal to the size of a plurality of said N or S poles and including one pole portion in the form of a single pole and other pole portions having a polarity opposite the polarity of said one pole portion, said other pole portions being disposed at the periphery of said one pole portion; and wherein
    the magnetization pattern defined by said one pole portion and said other pole portions are symmetrical relative to a virtual central traverse line central to said unequal pitch annular section, and said one pole portion has an area which is 40 to 60% of the area of said unequal pitch annular section; and
    wherein said one pole portion is shaped in the form of the letter H which is symmetrical relative to the virtual central traverse line.

2. The annular magnetic encoder as set forth in claim 1, wherein said other pole portions include pole portions located adjacent circumferentially opposed sides of said one pole portion and divided by said one pole portion.

3. The annular magnetic encoder as set forth in claim 1, wherein the annular magnetic body comprises a molded body made of magnetic rubber or magnetic resin.

4. The annular magnetic encoder as set forth in claim 1 wherein said other pole portions include poles within the H shape of said one pole portion.

* * * * *